US011339292B2

(12) United States Patent
Dreux et al.

(10) Patent No.: US 11,339,292 B2
(45) Date of Patent: *May 24, 2022

(54) FLAME-RETARDANT, MOISTURE-CURED WIRE AND CABLE CONSTRUCTIONS WITH IMPROVED GLANCING IMPACT PERFORMANCE

(71) Applicant: Dow Global Technologies LLC, Midland, MI (US)

(72) Inventors: Peter C. Dreux, Collegeville, PA (US); Vivek Tomer, Collegeville, PA (US); Manish K. Mundra, Collegeville, PA (US); Bharat I Chaudhary, Collegeville, PA (US); Abhijit Ghosh-Dastidar, Collegeville, PA (US); Rajen M. Patel, Freeport, TX (US); Kalyan Sehanobish, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/488,020

(22) PCT Filed: Mar. 1, 2018

(86) PCT No.: PCT/US2018/020465
§ 371 (c)(1),
(2) Date: Aug. 22, 2019

(87) PCT Pub. No.: WO2018/160846
PCT Pub. Date: Sep. 7, 2018

(65) Prior Publication Data
US 2020/0010682 A1 Jan. 9, 2020

Related U.S. Application Data

(60) Provisional application No. 62/466,767, filed on Mar. 3, 2017.

(51) Int. Cl.
| | |
|---|---|
| *C08L 83/10* | (2006.01) |
| *C08F 10/02* | (2006.01) |
| *C08J 3/22* | (2006.01) |
| *C08K 3/22* | (2006.01) |
| *C08K 5/03* | (2006.01) |
| *C08K 5/107* | (2006.01) |
| *C08K 13/02* | (2006.01) |

(52) U.S. Cl.
CPC .............. *C08L 83/10* (2013.01); *C08F 10/02* (2013.01); *C08J 3/226* (2013.01); *C08K 3/22* (2013.01); *C08K 3/2279* (2013.01); *C08K 5/03* (2013.01); *C08K 5/107* (2013.01); *C08K 13/02* (2013.01); *C08K 2003/2296* (2013.01); *C08L 2201/02* (2013.01); *C08L 2203/202* (2013.01); *C08L 2310/00* (2013.01)

(58) Field of Classification Search
CPC ........................................................ C08L 83/10
See application file for complete search history.

(56) References Cited

U.S. PATENT DOCUMENTS

| 5,430,091 A | 7/1995 | Mahabir et al. |
|---|---|---|
| 2005/0049335 A1 | 3/2005 | Lee et al. |
| 2005/0049343 A1 | 3/2005 | Borke et al. |
| 2005/0049633 A1 | 3/2005 | Borke et al. |
| 2016/0340498 A1* | 11/2016 | Assor .................. C08K 3/2279 |
| 2018/0112096 A1 | 4/2018 | Shimada et al. |

FOREIGN PATENT DOCUMENTS

| JP | S61133262 A | 6/1986 |
|---|---|---|
| WO | 9929776 A1 | 6/1999 |

OTHER PUBLICATIONS

English Machine Translation JPS61133262A obtained Nov. 18, 2020 at https://worldwide.espacenet.com/publicationDetails/biblio?CC=JP&NR=S61133262A&KC=A&FT=D&ND=3&date=19860620&DB=EPODOC&locale=en_EP#.*
DuPont Elvax EVA Resins Product Data obtained Mar. 26, 2021 at https://www.nevicolor.it/produkte/polymer-suchen/dupont/elvax/documenti/elvax-adhesives-wax-blends.pdf.*
International Search Report and Written Opinion issued for International Application No. PCT/US2018/020465 dated May 4, 2019.
Database WPI, Week 198631, Thomson Scientific, London, GB, AN 1986-201009, XP002778040.
Corresponding Extended Search Report of European Application No. 21187046.4, dated Dec. 10, 2021.
Office Action from corresponding Japanese Patent Application No. 2019-542579 dated Apr. 5, 2022.

* cited by examiner

*Primary Examiner* — Arrie L Reuther

(57) ABSTRACT

Articles made from a moisture-curable, polymeric composition comprising in weight percent based on the weight of the composition:
- (A) 2 to less than 80 weight percent (wt %) of an ethylenic polymer with (1) a crystallinity at room temperature of 34% to 55%, or 65% to 80%, and (2) a melt index ($I_2$) of 0.1 to 50 decigrams per minute (dg/min);
- (B) 3 to 30 wt % of a halogenated flame retardant;
- (C) 3 to 30 wt % an inorganic antimony flame retardant; and
- (D) 0 to 10 wt % of at least one of an inorganic flame retardant other than the inorganic antimony flame retardant, e.g., zinc oxide exhibit enhanced ACBD properties in comparison to articles alike in all respects except made from a composition comprising an ethylenic polymer without the requisite crystallinity at room temperature.

9 Claims, No Drawings

FLAME-RETARDANT, MOISTURE-CURED WIRE AND CABLE CONSTRUCTIONS WITH IMPROVED GLANCING IMPACT PERFORMANCE

FIELD OF THE INVENTION

This invention relates to wire and cable constructions, particularly to wire and cable insulation sheaths and protective jackets.

BACKGROUND OF THE INVENTION

Certain flame-retardant wire and cable constructions are required to exhibit sufficiently high retention of AC breakdown strength (ACBD) after being subjected to a glancing impact test. However, the polymer compositions used to fabricate the sheaths (insulation and/or jacket) of such wires and cables typically contain large amounts of flame-retardant fillers, which leads to a deterioration in this property. Thus, the industry is continuously looking for means to enhance retention of ACBD after glancing impact, especially in the case of silane-functionalized compositions that are subsequently moisture-crosslinked.

SUMMARY OF THE INVENTION

In one embodiment the invention is a masterbatch composition comprising in weight percent based on the weight of the composition:
  (A) 10 to 50 weight percent (wt %), or 12 to 45 wt %, or 15 to 40 wt %, of an ethylenic polymer with (1) a crystallinity at room temperature of 34% to 55%, or 65% to 80%, and (2) a melt index ($I_2$) of 0.1 to 50 decigrams per minute (dg/min), or 0.3 to 30 dg/min, or 0.5 to 20 dg/min;
  (B) 15 to 60 wt % of a halogenated flame retardant;
  (C) 15 to 60 wt % an inorganic antimony flame retardant, e.g., antimony trioxide; and
  (D) 0 to 20 wt % of at least one inorganic flame retardant other than the antimony flame retardant, e.g., one or more zinc compounds such as zinc oxide, zinc borate, zinc molybdate and zinc sulfide.
In one embodiment the masterbatch composition is thermoplastic. In one embodiment the ethylenic polymer of the masterbatch comprises hydrolysable silane groups.

In one embodiment the invention is a moisture-crosslinkable, polymeric composition comprising in weight percent based on the weight of the composition:
  (A) 32 to less than (<) 80 wt % of an ethylenic polymer with (1) a crystallinity at room temperature of 34% to 55%, or 65% to 80%, and (2) an $I_2$ of 0.1 to 50 dg/min, or 0.3 to 30 dg/min, or 0.5 to 20 dg/min;
  (B) 3 to 30 wt % of a halogenated flame retardant;
  (C) 3 to 30 wt % an inorganic antimony flame retardant, e.g., antimony trioxide;
  (D) 0.01 to 20 wt % of a silanol condensation catalyst;
  (E) 0 to 10 wt % of at least one inorganic flame retardant other than the antimony flame retardant, e.g., one or more zinc compounds such as zinc oxide, zinc borate, zinc molybdate and zinc sulfide.
In one embodiment the moisture-crosslinkable, polymeric composition is thermoplastic. In one embodiment the ethylenic polymer of the moisture-crosslinkable, polymeric composition comprises hydrolysable silane groups.

In one embodiment the invention is a moisture-crosslinkable, polymeric composition comprising in weight percent based on the weight of the composition:
  (A) 32 to less than (<) 80 wt % of an ethylenic polymer with (1) a crystallinity at room temperature of 34% to 55%, or 65% to 80%, and (2) an $I_2$ of 0.1 to 50 dg/min, or 0.3 to 30 dg/min, or 0.5 to 20 dg/min;
  (B) 3 to 30 wt % of a halogenated flame retardant;
  (C) 3 to 30 wt % an inorganic flame retardant; e.g., antimony trioxide;
  (D) 0.3 to 5 wt % of a graftable silane-containing compound, e.g., an alkoxysilane;
  (E) 0.01 to 20 wt % of a silanol condensation catalyst;
  (F) 0.02 to 0.1 wt % peroxide initiator; and
  (G) 0 to 10 wt % of at least one inorganic flame, retardant other than the antimony flame retardant, e.g., one or more zinc compounds such as zinc oxide, zinc borate, zinc molybdate and zinc sulfide.
In one embodiment the moisture-crosslinkable, polymeric composition is thermoplastic.

In one embodiment the invention is a moisture-crosslinkable, polymeric composition comprising in weight percent based on the weight of the composition:
  (A) 30 to 79 wt %, or 31 to 78 wt %, or 32 to 77 wt %, of an ethylenic polymer of any crystallinity at room temperature having hydrolysable silane groups;
  (B) 2 to less than (<) 27 wt % of an ethylenic polymer (1) other than the ethylenic polymer of (A) in the moisture-crosslinkable, polymeric composition, and (2) with (a) a crystallinity at room temperature of 34% to 55%, or 65% to 80%, and (b) an $I_2$ of 0.1 to 50 dg/min, or 0.3 to 30 dg/min, or 0.5 to 20 dg/min;
  (C) 3 to 30 wt % of a halogenated flame retardant;
  (D) 3 to 30 wt % an inorganic antimony flame retardant, e.g., antimony trioxide;
  (E) 0.01 to 20 wt % of a silanol condensation catalyst; and
  (F) 0 to 10 wt % of at least one inorganic flame retardant other than the antimony flame retardant, e.g., one or more zinc compounds such as zinc oxide, zinc borate, zinc molybdate and zinc sulfide.
In one embodiment the moisture-crosslinkable, polymeric composition is thermoplastic.

In one embodiment the invention is a moisture-crosslinkable, polymeric composition comprising in weight percent based on the weight of the composition:
  (A) 30 to 79 wt %, or 31 to 78 wt %, or 32 to 77 wt %, of an ethylenic polymer of any crystallinity at room temperature;
  (B) 2 to less than (<) 27 wt % of an ethylenic polymer (1) other than the ethylenic polymer of (A) in the moisture-crosslinkable, polymeric composition, and (2) with (a) a crystallinity at room temperature of 34% to 55%, or 65% to 80%, and (b) an $I_2$ of 0.1 to 50 dg/min, or 0.3 to 30 dg/min, or 0.5 to 20 dg/min;
  (C) 3 to 30 wt % of a halogenated flame retardant;
  (D) 3 to 30 wt % an inorganic flame retardant, e.g., antimony trioxide;
  (E) 0.3 to 5 wt % of a graftable silane-containing compound, e.g., an alkoxysilane;
  (F) 0.01 to 20 wt % of a silanol condensation catalyst;
  (G) 0.02 to 0.1 wt % peroxide initiator; and
  (H) 0 to 10 wt % of at least one inorganic flame retardant other than the antimony flame retardant, e.g., one or more zinc compounds such as zinc oxide, zinc borate, zinc molybdate and zinc sulfide.
In one embodiment the moisture-crosslinkable, polymeric composition is thermoplastic.

In one embodiment the ethylenic polymer with a crystallinity at room temperature of 34% to 55%, or 65% to 80%, is a linear, or substantially linear, ethylene homopolymer or ethylene-α-olefin copolymer. In one embodiment the ethylenic polymer with a crystallinity at room temperature of 34% to 55%, or 65% to 80%, is a branched ethylene homopolymer or a copolymer of ethylene and an unsaturated ester or a copolymer of ethylene and a monomer with hydrolyzable silane groups. In one embodiment the graftable alkoxysilane is vinyltrimethoxysilane (VTMS).

In one embodiment the invention is a wire or cable comprising a coating made from a composition of one of the embodiments described above. In one embodiment the coating is a sheath that is an insulation and/or a protective outer jacket. In one embodiment the wire or cable comprising a coating made from one of the compositions of the embodiments described above exhibits a retained ACBD after glancing impact of greater than or equal to (≥) 2%, or ≥5%, or ≥10%, or ≥15%, or ≥20%, or ≥25%, or ≥30%, or ≥35%, or ≥40%, or ≥45%, or ≥50%, or ≥55%.

DETAILED DESCRIPTION OF THE INVENTION

Definitions

Any reference to the Periodic Table of Elements is that as published by CRC. Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any, definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Composition" and like terms mean a mixture of materials which comprise the composition, as well as reaction products and decomposition products formed from the materials of the composition.

"Polymer" and like terms mean a macromolecular compound prepared by reacting (i.e., polymerizing) monomers of the same or different type. "Polymer" includes homopolymers and interpolymers. Trace amounts of impurities, for example, catalyst residues, may be incorporated into and/or within the polymer. The term also embraces all forms of copolymer, e.g., random, block, etc. Although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers are referred to has being based on "units" that are the polymerized form of a corresponding monomer.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Polyolefin", "PO" and like terms mean a polymer derived from simple olefins. Many polyolefins are thermoplastic: and for purposes of this invention, can include a rubber phase. Representative polyolefins include polyethylene, polypropylene, polybutene, polyisoprene and their various interpolymers.

"Ethylenic polymer", "ethylene-based polymer," "ethylene polymer," "polyethylene" and like terms mean a polymer that contains equal to or greater than 50 weight percent (wt %), or a majority, amount, of polymerized ethylene based on the weight of the polymer, and, optionally, may comprise one or more comonomers. The generic term "ethylene-based polymer" thus includes ethylene homopolymer and ethylene interpolymer.

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

A "sheath" is a generic term and when used in relation to cables, it includes insulation coverings or layers, protective jackets and the like.

A "wire" is a single strand of conductive metal, e.g., copper or aluminum, or a single strand of optical fiber.

A "cable" is at least one conductor, e.g., wire, optical fiber, etc., within a protective jacket or sheath. Typically, a cable is two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496,629; and 6,714,707.

"Crosslinkable," "curable" and like terms indicate that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to water).

"Moisture-crosslinkable polymeric composition" and like terms mean a composition that comprises a polymer that can be crosslinked upon exposure to humidity or water under appropriate temperature. Preferably, one of the polymers in the composition has hydrolysable silane groups.

"Hydrolysable silane group" and like terms mean a silane group that will react with water. These include alkoxysilane groups on monomers or polymers that can hydrolyze to yield silanol groups, which in turn can condense to crosslink the monomers or polymers.

"Room temperature" and like terms mean 25° C.±4° C.

Ethyienic Polymer

The ethylenic polymers used in the practice of this invention can be branched, linear, or substantially linear, and can be made by polymerization or copolymerization. in a reactor (low pressure or high pressure) or by post-reactor modification (such as reactive extrusion to make a graft copolymer). As used herein, the term "high-pressure reactor" or "high-pressure process" is any reactor or process operated at a pressure of at least 5000 pounds per square inch (psi) (34.47 megaPascal or mPa). As known to those of ordinary skill in the art, "branched" ethylenic polymers are often (but not only) prepared in a high-pressure reactor or process and tend to have highly branched polymer structures, with branches found both on the polymer backbones and on the branches themselves. In contrast, "substantially linear" denotes a polymer having a backbone that is substituted with 0.01 to 3 long-chain branches per 1,000 carbon atoms. In some embodiments, the ethylenic polymer can have a backbone that is substituted with 0.01 to 1 long-chain branches per 1,000 carbon atoms, or from 0.05 to 1 long-chain branches per 1,000 carbon atoms.

The ethylenic polymers used in the practice of this invention include both homopolymers and interpolymers, random and blocky copolymers, and functionalized (e.g., ethylene vinyl acetate, ethylene ethyl acrylate, etc.) and non-functionalized polymers. The ethylenic interpolymers include elastomers, flexomers and plastomers. The ethylene polymer comprises at least 50, preferably at least 60 and more preferably at least 80, wt % of units derived from ethylene. The other units of the ethylenic interpolymer are typically derived from one or more polymerizable monomers including (but not limited to) α-olefins and unsaturated esters.

The α-olefin is preferably a C3-20 linear, branched or cyclic α-olefin. Examples of C3-20 α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene. (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethylenic interpolymers include copolymers of ethylene/propylene, ethylene/butene, ethylene/1-hexene, ethylene/1-octene, ethylene/styrene, and the like. Illustrative ethylenic terpolymers include ethylene/propylene/1-octene, ethylene/propylene/butene, ethylene/butene/1-octene, ethylene/propylene/diene monomer (EPDM) and ethylene/butene/styrene.

In various embodiments, the unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. Examples of acrylates and methacrylates include, but are not limited to, ethyl acrylate, methyl acrylate, methyl methacrylate, t-butyl acrylate, n-butyl acrylate, n-butyl methacrylate, and 2 ethylhexyl acrylate. Examples of vinyl carboxylates, include, but are not limited to, vinyl acetate, vinyl propionate, and vinyl butanoate.

Examples of ethylenic polymers useful in the practice of this invention include high density polyethylene (HDPE); medium density polyethylene (MDPE); linear low density polyethylene (LLDPE); low density polyethylene (LDPE); very low density polyethylene (VLDPE); homogeneously branched, linear ethylene/α-olefin copolymers (e.g. TAFMER™ by Mitsui Petrochemicals. Company Limited and EXACT™ by DEX-Plastomers); homogeneously branched, substantially linear ethylene/α-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company). The substantially linear ethylene copolymers are more fully described in U.S. Pat. Nos. 5,272,236, 5,278,272 and 5,986,028, and the ethylene block copolymers are more fully described in U.S. Pat. Nos. 7,579,408, 7,355,089 7,524,911, 7,514,517, 7,582, 716 and 7,504,347.

Ethylenic interpolymers of particular interest for use in the practice of this invention are LDPE, linear low density polyethylene (LLDPE) and HDPE. These ethylenic copolymers are commercially available from a number of different sources including The Dow Chemical Company under such trademarks as DOWLEX™, ATTANE™ and FLEXOMER™. One preferred polymer is linear low density polyethylene (LLDPE).

The amount of ethylenic polymer present in the compositions of this invention can vary widely, but the amount is typically 2 to 50, 5 to 50, more typically 7 to 45 and even more typically 9 to 40, wt % based on the total weight of the composition. The ethylene, polymer can be present as a single polymer, e.g., LLDPE, or as a blend of two or more polymers, e.g., LLDPE and HDPE.

They ethylenic polymers have a melt index ($I_2$) in the range of 0.1 to 50 decigrams per minute (dg/min), or 0,3 to 30 dg/min, or 0.5 to 20 dg/min. $I_2$ is determined under ASTM D-1238, Condition E and measured at 190° C. and 2.16 kg.

In one embodiment, the crystallinity at room temperature of the ethylenic polymer ranges from 34% to 55% or from 65% to 80%. In one embodiment the crystallinity at room temperature ranges from 34 to 54%, or 53%, or 52%, or 51%, or 50%, or 49%, or 48%, or 47%, or 46%, or 45%, or 44%, or 43%, or 42%, or 41%, or 40%, or 39%, or 38%, or 37%, or 36%, or 35%. In one embodiment the crystallinity at room temperature ranges from 55% to 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%. In one embodiment the crystallinity at room temperature ranges from 35% to 54%; or 36% to 53%, or 37% to 52%, or 38% to 51%, or 39% to 50%, or 40% or 49%, or 41% to 48%, or 42% to. 47%, or 43% to 46%, or 44% to 45%.

In one embodiment the crystallinity at room temperature of the ethylenic polymer ranges from 65 to 79%, or 78%, or 77%, or 76%, or 75%, or 74%, or 73%, or 72%, or 71%, or 70%, or 69%, or 68%, or 67%, or 66%. In one embodiment the crystallinity at room temperature ranges from 80% to 66%, or 67%, or 68%, or 69%, or 70%, or 71%, or 72%, or 73%, or 74%, or 75%, or 76%, or 77%, or 78%, or 79%. In one embodiment the crystallinity at room temperature ranges from 66% to 79%, or 67% to 78%, or 68% to 76%, or 69% to 75%, or 70% to 74%.

In one embodiment, the ethylenic polymer is of any crystallinity at room temperature. In one embodiment, the crystallinity at room temperature of the ethylenic polymer ranges from 0% to 80%.

Crystallinity at room temperature is calculated or measured as described in the Examples.

In one embodiment, the moisture-curable composition contains 2 to less than (<) 27 wt %, alternatively 2 to less than 15 wt %, alternatively 15 wt % to 20 wt %, alternatively greater than (>) 20 wt % to 27 wt %, of ethylenic polymer of crystallinity at room temperature of 34% to 55%, or 65% to 80%.

In one embodiment, the moisture-curable composition contains 32 to less than (<) 80 wt % of ethylenic polymer of crystallinity at room temperature of 34% to 55%, or 65% to 80%.

Ethylenic Polymer Having Hydrolysable Silage Groups

In one embodiment of the invention, the composition comprises, as (or in addition to) the ethylenic polymer described above, an ethylenic polymer having hydrolysable, silane groups or a silane-functionalized ethylenic polymer.

Ethylenic Polymer

The ethylenic polymers that contain hydrolysable silane groups (silane functionality), or are subsequently grafted with a silane, are the same as those described above.

Silane Functionality

Any silane (or silane-containing compound) that will effectively copolymerize with ethylene, or graft to an ethylenic polymer, and thus enable crosslinking of the ethylenic polymer, can be used in the practice of this invention, and those described by the following formula are exemplary

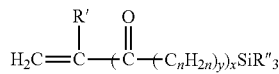

in which R' is a hydrogen atom or methyl group; x and y are 0 or 1 with the proviso that when x is 1, y is 1; n is an integer from 1 to 12 inclusive, preferably 1 to 4, and each R" independently is a hydrolyzable organic group such as, an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1, to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl. Such silanes may be copolymerized with ethylene in a reactor, such as a high pressure process, to make a copolymer of ethylene and a monomer with hydrolyzable silane groups. Such silanes may also be grafted to a suitable ethylenic polymer, such as those described above, by the use of a suitable quantity of organic peroxide, either before or during a shaping or molding operation, to make a silane-grafted ethylenic polymer (Si-g-EP) or copolymer of ethylene and a monomer with hydrolyzable silane groups.

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in USP 5,266,627. Vinyl trimethoxy silane (VTMS), vinyl triethoxy silane, vinyl triacetoxy silane, gamma(meth)acryloxy propyl trimethoxy silane and mixtures of these silanes are the preferred silane crosslinkers for use in this invention.

The amount of silane used to functionalize the ethylenic polymer can vary widely depending upon the nature of the polymer, the silane, the processing or reactor conditions, the grafting or copolymerization efficiency, the ultimate application, and similar factors, but typically at least 0.5, preferably at least 0.7, weight percent is used. Considerations of convenience and economy are two of the principal limitations on the maximum amount of silane used, and typically the maximum amount of silane does not exceed 5, preferably it does not exceed 3, weight percent.

The silane is grafted to the ethylenic polymer by any conventional method, typically in the presence of a free radical initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.02, preferably at least 0.04, more preferably at least 0.06, parts per hundred. resin (phr). Typically, the initiator does not exceed 0.15, preferably it does not exceed 0.10, phr. The ratio of silane to initiator also can vary widely, but the typical crosslinker:initiator ratio is between 10:1 to 30:1, preferably between 18:1 and 24:1. As used in parts per hundred resin or phr, "resin" means the ethylenic polymer.

While any conventional method can be used to graft the silane to the ethylenic polymer, one preferred method is, blending the two with the initiator in, the first stage of a reactor extruder, such as a twin screw extruder or BUSS™ kneader. Such a process to make silane-grafted ethylenic polymer (Si-g-EP) is referred to as the SIOPLAS process, in which a silane monomer is, grafted onto the backbone of a base ethylenic polymer by a process such as extrusion, prior to the polymer's incorporation into the present composition, as described, for example, in U.S. Pat. Nos. 4,574,133; 6,048,935; and 6,331,597. The grafting conditions can vary, but the melt temperatures are typically between 160, and 260° C., preferably between 190 and 230° C., depending upon the residence time and the half-life of the initiator.

In an embodiment, the silane-functionalized ethylenic polymer is, an in situ Si-g-EP. The in situ Si-g-EP is formed by a process such as the MONOSIL process, in which a silane monomer is grafted onto the backbone of a base ethylenic polymer during the extrusion of the present composition to form a coated conductor, as described, for example, in U.S. Pat. No. 4,574,133.

Copolymerization of unsaturated alkoxy silane crosslinkers with ethylene and other monomers may be done in a high-pressure reactor that is used in the manufacture of ethylene homopolymers and copolymers with vinyl acetate and acrylates.

In one embodiment of the invention in which the composition comprises a silane-functionalized ethylenic polymer, the amount of the silane-functionalized polymer in the composition is typically from 30 to 79 wt %, or to 78 wt %, or to 77 wt %, or to 76 wt %, or to 75 wt %, or to 70 wt %, or to 65 wt %, or to 60 wt %, or to 55 wt %, or to 50 wt %, or to 45 wt %, or to 40 wt %.

In one embodiment of the invention in which the composition comprises a silane-functionalized ethylenic polymer, the amount of the silane-functionalized polymer in the composition is typically from 79 to 31 wt %, or to 32 wt %, or to 33 wt %, or to 34 wt %, or to 35 wt %, or to 36 wt %, or to 37 wt %, or to 38 wt %, or to 39 wt %, or to 40 wt %, or to 45 wt %, or to 50 wt %, or to 55 wt %, or to 60 wt %, or to 65 w %, or to 70 wt %.

Silanol Condensation Catalyst

In one embodiment the composition of the invention includes a silanol condensation catalyst to promote crosslinking and insure moisture cure. Silanol condensation catalysts known in the art for crosslinking alkoxysilane polymers can be employed for the compositions of the invention. Such catalysts include organic bases, carboxylic acids and organometallic compounds including organic titanates and complexes or carboxylates of lead, cobalt, iron, nickel, zinc and tin, such as dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylates, especially dibutyltindilaurate and di octyltinmaleate, are particularly useful silanol condensation catalysts for the compositions of the invention. The silanol condensation catalyst will be present in an amount from 0.01 to 20 wt %, or from 0.025 to 10 wt %, or from 0.05 to 5 wt %, or from 0.1 to 3 wt %, based on the total weight of the composition. The silanol condensation catalyst may be introduced in the form of a masterbatch. In one embodiment the silanol condensation catalyst is a component of a masterbatch in an amount greater than 0 wt % and preferably less than 40 wt %.

Halogenated Flame Retardant

At least one halogenated organic flame retardant additive is employed for the insulation compositions of the invention. Useful halogenated organic compounds have at least one halogen atom, preferably bromine or chlorine, bonded to an aromatic or cycloaliphatic ring which can be monocyclic, bicyclic or multicyclic rings. Bromine is the preferred halogen. The halogenated compound may contain other functional groups which do not adversely affect the processing or physical characteristics of the composition.

Examples of halogenated compounds of the above type include perchloropentacycl odecane; Diels-Alder adducts of hexachlorocyclopentadiene with "enes" such as maleic anhydride; hexabromobenzene; pentabromoethylbenzene 2,4,6-tribromophenol; tribromophenyl allyl ether; octaobromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylenebis(tetrabromophthatmide); hexabromocyclododecane; and the like. Other halogenated compounds useful in the practice of this invention are described in U.S. Pat. No. 6,936,655.

To minimize the amount of the flame retardant compound used, halogenated compounds with high halogen contents are advantageously employed. Particularly desirable are brominated aromatic compounds having bromine contents greater than 65 percent and, more preferably, greater than 75 percent. In a highly useful embodiment, the flame retardant compound is decabromodiphenyl ether or ethane-1,2-bis (pentabromophenyl).

In one embodiment the halogenated flame retardant will comprise 3 to 60 wt %, or 5 to 55 wt %, or 10 to 50 wt %, or 15 to 45 wt %, of the total composition.

Inorganic Flame Retardants

Inorganic flame retardants are typically used in combination with the halogenated flame retardants. While useful flame retardant formulations are available without such inorganic compounds, flame retardance is increased when they are included and this usually results in the use of lower levels of the halogenated compound. This latter feature is advantageous from an economic standpoint and also from the standpoint of maximizing the physical properties and processability. While an inorganic antimony flame retardant, e.g., antimony trioxide, is typically the inorganic flame retardant of choice, other known and useful (non-limiting) inorganic flame retardants include antimony pentoxide, antimony silicates, boron compounds, carbon black, calcium carbonate, metal hydrates, calcined clay, tin oxide, zinc oxide, zinc borate, zinc molybdate, zinc sulfide, aluminum trioxide and aluminum trihydroxide. The inorganic flame retardant may be coated with a material that will prevent or retard any tendency that the inorganic flame retardant might otherwise have to interfere with the silane cure reaction. Stearic acid is illustrative of such a coating material. Selection of inorganic flame retardant and catalyst is made to avoid any undesired interactions and reactions. The weight ratio of halogenated compound to inorganic flame retardant typically ranges from 0.5:1 to 5:1 and, more typically, from 0.7:1 to 4:1, and, even more typically, from 1:1 to 3:1.

In one embodiment the composition of the invention comprises at least one inorganic antimony flame retardant. In one embodiment the at least one inorganic antimony flame retardant is antimony trioxide, antimony pentoxide, or an antimony silicate. In one embodiment the inorganic antimony flame retardant is antimony trioxide.

In one embodiment the composition of the invention comprises at least one inorganic antimony flame retardant in combination with at least one of a zinc compound, including (but not limited to) zinc oxide, zinc borate, zinc molybdate, and zinc sulfide. In one embodiment the at least one inorganic antimony flame retardant is antimony trioxide, antimony pentoxide, or an antimony silicate. In one embodiment the inorganic antimony flame, retardant is antimony trioxide. In one embodiment the composition of the invention comprises antimony trioxide in combination with at least one of zinc oxide, zinc borate, zinc molybdate, and zinc sulfide. In one embodiment the inventive composition comprises an inorganic antimony flame retardant but without any of zinc oxide, zinc borate, zinc molybdate, and zinc sulfide. In one embodiment the inventive composition comprises an inorganic antimony flame retardant but without any other inorganic flame retardant.

In one embodiment the total inorganic flame retardant will comprise 3 to 80 wt %, or 5 to 70 wt %, or 10 to 60 wt %, or 15 to 50 wt %, of the composition of the invention. In one embodiment an antimony flame retardant, preferably antimony trioxide, will comprise 3 to 60 wt %, or 5 to 55 wt %, or 10 to 50 wt %, or 15 to 45 wt %, of the composition of the invention, and at least one of zinc oxide, zinc borate, zinc molybdate, and zinc sulfide will comprise zero to 20 wt %, or greater than zero to 20 wt %, or 1 to 15 wt %, or 2 to 10 wt %, of the composition of the invention.

Masterbatch

In one embodiment of the invention, the composition is a flame retardant masterbatch, preferably a thermoplastic flame retardant masterbatch, comprising the ethylenic polymer, a halogenated flame retardant and an inorganic flame retardant. In the context of this invention, a masterbatch, sometimes also referred to as a concentrate, has a relatively high concentration of the flame retardants in a carrier resin in which the flame retardants can be readily dispersed and which is compatible with the silane-functionalized ethylenic polymer. The carrier resin in this embodiment of the invention is the ethylenic polymer of the crystallinity at room temperature of 34% to 55%, or 65% to 80%. In an embodiment, the other units of the ethylenic polymer are derived from one or more polymerizable or graftable monomers with hydrolyzable silane groups.

In one embodiment the masterbatch composition comprises in weight percent based on the total weight of the masterbatch:
  (A) 10 to 5.0 weight percent (wt %), or 12 to 45 wt %, or 15 to 40 wt %, of an ethylenic polymer with (1) a crystallinity at room temperature of 34% to 55%, or 65% to 80%, and (2) a melt index ($I_2$) of 0.1 to 50 decigrams per minute (dg/min), or 0.3 to 30 dg/min, or 0.5 to 20 dg/min;
  (B) 15 to 60 wt %, or 20 to 55 wt %, or 25 to 50 wt %, of a halogenated flame retardant, e.g., ethylene-1,2-bis(pentabromophenyl);
  (C) 15 to 60 wt %, or 20 to 55 wt %, or 25 to 50 wt % of an inorganic antimony flame retardant, e.g., antimony trioxide; and
  (D) 0 to 20 wt %, or greater than zero to 20 wt %, or 1 to 15 wt %, or 2 to 10 wt %, of at least one of an inorganic flame retardant other than the antimony compound, e.g., at least one of a zinc compound such as zinc oxide, zinc borate, zinc molybdate and zinc sulfide.

In one embodiment the masterbatch is thermoplastic. In one embodiment the masterbatch can comprise one or more additives such as an antioxidant, ultraviolet (UV) stabilizer, silanol condensation catalyst, release agent, processing aid, nucleating agent, colorant, pigment, metal deactivator, lubricant, other polymer, and the like. These additives are employed in known ways and in known amounts. UV stabilizer includes, but is not limited to, hindered amine light stabilizer (HALS) and titanium dioxide. In one embodiment the silanol condensation catalyst is a component of the masterbatch of this invention in an amount greater than 0 wt % and preferably less than 40 wt %. In one embodiment the UV stabilizer is a component of the masterbatch of this invention in an amount greater than 0 wt % and preferably less than 5 wt %.

The use of masterbatches to more effectively incorporate ingredients, including those used at low levels, into polyolefin resins is well known. This procedure is also useful since it minimizes the number of materials which must be stored and handled by processors.

Masterbatches are prepared in much the same manner as any polyolefin composition, e.g., city blending and/or melt blending the ingredients into a relatively homogeneous mass. The masterbatch, typically in pellet form or some other form suitable for storage and/or handling, is then "letdown" into the silane-functionalized ethylenic polymer to which other ingredients may have already been added, in an amount calculated to achieve the desired level of the "letdown" additives in the final product. These other additives can be added directly, or they too can be added as part of a masterbatch, e.g., as part of the masterbatch comprising the halogenated and inorganic flame retardants, or as part of another, different masterbatch.

Moisture-Crosslinkable, Polymeric Composition

In one embodiment the moisture-crosslinkable, polymeric compositions of this invention comprises an ethylenic polymer of any crystallinity having hydrolysable silane groups, an ethylenic polymer with crystallinity at room temperature of 34% to 55%, or 65% to 80%, a halogenated flame retardant, an inorganic flame retardant and a silanol condensation catalyst.

In one embodiment the moisture-crosslinkable, polymeric composition of this invention comprises an ethylenic polymer without hydrolysable silane groups, a graftable silane, e.g., an unsaturated alkoxy silane, and a free-radical, e.g., peroxide, initiator, an ethylenic polymer with crystallinity at room temperature of 34% to 55%, or 65% to 80%, a halogenated flame retardant, an inorganic flame retardant. In this embodiment the silane grafts to the ethylenic polymer during the process in which the composition is used to fabricate the end-use article, such as melt extrusion to make a wire and cable construction.

In one embodiment, the moisture-crosslinkable, polymeric composition comprises a UV stabilizer in an amount greater than 0 wt % and preferably less than 3 wt %. In one embodiment the UV stabilizer is delivered as a component of a masterbatch in an amount greater than 0 wt % and preferably less than 5 wt %.

Compounding of the moisture-crosslinkable, polymeric composition can be effected by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a WERNER AND PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness, and these are well known to those skilled in the art.

The moisture-crosslinkable, polymeric composition of this invention can be applied to a conductor as a coating (including a sheath that is an insulation and/or a protective outer jacket) in known amounts or thicknesses and by known methods to make an article that is a wire or cable (for example, with the equipment and methods described in U.S. Pat. Nos. 5,246,783 and 4,144,202). Typically, the polymer composition is prepared in a reactor-extruder equipped with a conductor-coating die and after the components of the composition are formulated, the composition is extruded over the conductor as the conductor is drawn through the die. In a preferred embodiment of this invention in which the ethylene polymer having hydrolysable silane groups has a melt index ($I_2$ of about 0.3 to 7 dg/min), the insulation or sheath coated onto the conductor will cure (crosskink) within 60 days at room temperature or 24 hours in a 90° C. water bath.

Other articles of manufacture that can be prepared from the moisture-crosslinkable, polymeric composition of this invention, particularly under high pressure and/or elevated moisture conditions, include fibers, ribbons, sheets, tapes, tubes, pipes, weather-stripping, seals, gaskets, foams, footwear and bellows. These articles can be manufactured using known equipment and techniques.

The articles made from the moisture-curable, polymeric compositions of this invention can be moisture-cured in a water bath or a sauna or at ambient conditions (room temperature and humidity) to effect crosslinking. The time to complete crosslinking will depend on conditions such as article or coating thickness, temperature, humidity, catalyst employed, etc.

Moisture-cured wires or cables comprising a coating (including a sheath that is an insulation and/or a protective outer jacket) prepared from the moisture-curable, polymeric compositions of this invention preferably not only pass the glancing impact test requirements designated by Underwriters Laboratories Inc (UL) for XHHW cable applications (UL 2556 Section 7.14, Edition Number: 4, Edition Date: Dec. 15, 2015 or any of Editions 1 to 4 of the UL 2556 standard), but they also exhibit enhanced retention of ACBD after glancing impact properties relative to compositions alike in all respects save for the crystallinity at room temperature of 34% to 55%, or 65% to 80%, of at least one of the ethylenic polymers. In one embodiment a moisture-cured wire or cable made from one of the compositions of this invention retains an ACBD value, after glancing impact, of ≥2%, or ≥5%, or ≥10%, ≥15%, or ≥20%, or ≥25%, or ≥30%, or ≥35%, or ≥40%, or ≥45%, or ≥50%, or ≥55% as measured by the UL test. The pass criterion in this UL test is ≥20% retention of ACBD.

In an embodiment, moisture-cured wires or cables comprising a coating (including a sheath that is an insulation and/or a protective outer jacket) prepared from the moisture-curable, polymeric compositions of this invention exhibit values of crush resistance greater than or equal to 1200 psi.

In an embodiment, moisture-cured wires or cables comprising a coating. (including a sheath that is an insulation and/or a protective outer jacket) prepared from the moisture-curable, polymeric compositions of this invention exhibit values of wet insulation resistance from 0.1 Megaohm/1000 ft to 150,000,000 Megaohm/1000 ft at 75° C. or 90° C. over a period of 0 to 36 weeks.

The following examples further illustrate the invention. Unless otherwise stated, all parts and percentages are by weight. Table 1 shows the properties of the polymers employed in making the compositions.

EXAMPLES

Inventive Examples 1 to 6 (IE1 to IE6) and Comparative Examples 1 to 3 (CE1 to CE3)

The compositions are reported in Table 2 and are prepared using a 420 mL BRABENDER mixing bowl with cam rotors. The batch mass is calculated to provide 70% fill of the mixing bowl with the flame retardant formulations of high specific gravity (nominal 2.2-2.4). The mixing bowl is pre-heated to a set temperature of 125° C. and the rotor speed set to 25 rpm. Half of the polymer (properties shown in Table 1) is added to the bowl and fluxed until a polymer melt is formed. Next, the fillers (i.e. halogenated flame retardant, antimony trioxide, zinc oxide), of relatively high densities, are added and incorporated into the polymer melt. The remaining amounts of polymers and antioxidants are then added and the rotor speed is increased to 40 rpm. The batch is allowed to flux for an additional 5 minutes. Upon removal from the mixing bowl the formulation is placed in a cold press for 5 minutes. The resulting plaque is cut into smaller pieces which are placed in a 8 inch×8 inch×150 mil mold and compression molded at the following conditions: 125° C. for 5 minutes at 500 psi, followed by 2500 psi for 5 minutes, and subsequently slow cooling at this pressure until the mold temperature reaches 40° C. The compression molded plaque is then guillotined into strips and placed in a Wiley mill to produce small chips. The chips are then fed to a Brabender model Prep Mixer/Measuring Head laboratory electric batch mixer equipped with 24:1 extruder, A 24:1 Maddox mixing head screw is employed to convey and melt the polymer through a stranded die (at 40 rpm screw speed, using a 20/40/60/20 mesh screen pack and a flat set temperature profile of 140° C. across zone 1, zone 2, zone 3 and die). The strand extrudate is again Wiley milled to produce pellets. These compositions are all thermoplastic and can be used to make thermoplastic flame-retardant sheaths of wire constructions, as well as, flame-retardant masterbatches in blends with other components (Table 3).

Inventive Examples 7 to 12 (IE7 to IE12) and Comparative Examples 4 to 6 (CE4 to CE6)

The compositions are reported in Table 3. The flame-retardant masterbatches of Table 2 are melt mixed with SI-LINK™ AC DFDB-5451 NT and SI-LINK™ DFDα-5481 (catalyst masterbatch) during extrusion to make wire constructions on 14 AWG solid copper with a nominal 30 mil wall thickness. The unit consists of a BRABENDER ¾" extruder with variable speed drive, a 24:1 Maddox mixing head screw, a BRABENDER cross-head wire die, lab water cooling trough with air wipe, a laser micrometer and a variable speed wire puller. The samples are extruded at 60 rpm screw speed and 10 feet per minute take-up speed, using a flat set temperature profile of 150° C. (across zone 1, zone 2, zone 3 and head/die) and a 20/40/60/20 mesh screen pack. All wires were subsequently cured in a 90° C. water bath for 12 hours to ensure full crosslinking prior to physical and flame testing. The inventive examples all exhibited satisfactorily high ACBD after glancing impact as measured by UL 2556 Section 7.14, Edition Number: 4, Edition Date: Dec. 15, 2015, i.e., all had a retained value in excess of 30% and one (IE-11) had a retained value of 96%. Hot creep measured at 150° C. is a measure of the degree of crosslinking, with lower values indicative of greater crosslinking. The VW-1 vertical burn test is aimed at assuring high degree of flame retardance in installed wires. In order to pass the VW-1 test, protocol samples exhibit no after-burns greater than 60 seconds, should not ignite the cotton batting below the test specimen nor burn more than 25% of the indicator flag located at the top of the specimen. As an additional parameter of burn performance the uncharred length of specimen was measured.

Inventive Examples 13 to 17 (IE13 to IE17) and Comparative Examples 7 to 8 (CE7 to CE8)

The compositions are reported in Table 4. The various components (with the exception of SI-LINK™ DFDα-5481)

are pre-mixed (melt-mixed), using the same procedure as that used for IE1 to IE6 and CE1 to CE3, prior to use in making wire constructions (using the procedure employed with IE7 to IE12 and CE4 to CE6) that are subsequently crosslinked by curing for 12 hours in a hot water bath set at 90° C. The inventive examples all exhibited satisfactorily high ACBD after glancing impact as measured by UL 2556 Section 1.14, Edition Number: 4, Edition Date: Dec. 15, 2015, i.e., all had a retained value in excess of 40% and one (IE-17) had a retained value of 85%. Crush resistance values are representative of the resistance to damage resulting from mechanical load during or after installation, with higher values indicative of better crush resistance.

Inventive Example 18 (IE18) and Comparative Example 9 (CE9)

The compositions are reported in Table 5. With a view to mimicking the Monosil process for in slat silane grafting, the liquid additives (VTMS and LUPEROX™ 1.01 peroxide) are soaked into the, physical blends of DFDα-7530 NT and flame-retardant masterbatches of Table 2. This is done by tumble mixing DFDα-7530 with flame retardant masterbatches in a fiber drum and then adding VTMS and LUPEROX™ 101 at room temperature and doing additional tumble blending for 5 minutes. The drum is then left for soaking of the liquid additives into the physical blends at room temperature for at least 12 hours. Lid of the drum is then opened under a local elephant trunk vent or local exhaust ventilation. Next, the physical blends containing DFDα-7530, flame retardant masterbatches (and soaked with VTMS and peroxide) are tumble-mixed with SI-LINK™ DFDα-5481, and the resulting physical blend is melt-mixed during wire extrusion to make wire constructions (14 AWG solid copper wire, 30 mil nominal wall thickness) that are subsequently crosslinked by curing in a hot water bath set at 90° C. for at least 8 hours. The wires are fabricated using a 2.5-inch. Davis Standard extruder with a double-flighted Maddock screw and 20/40/60/20 mesh screens, at the following set temperatures (° C.) across zone 1/zone 2/zone 3/zone 4/zone 5/head/die: 176.7/182.2/187.8/193.3/193.3/182.2/182.2. The length-to-diameter (LAD) ratio of the screw is 26 (measured from the beginning of the screw flight to the screw tip) or 24 (measured from the screw location corresponding to the end of the feed casing to the screw tip). The wire construction of CE9 is fabricated using screw speed of 11.75 rpm and line speed of 75 feet per minute. The wire construction of IE18 is fabricated using screw speed of 24.75 rpm and line speed of 150 feet per minute. IE18 of the present invention (which utilizes a flame-retardant masterbatch containing high density polyethylene of 78% crystallinity at room temperature) exhibited satisfactorily high ACBD after glancing impact (38%) as measured by UL 2556 Section 7.14, Edition Number: 4, Edition Date: Dec. 15, 2015, greater than that observed with CE9 (25%, which utilized a flame-retardant masterbatch containing ethylene-ethyl acrylate copolymer of 32.8% crystallinity at room temperature).

Test Methods

Density is measured according to ASTM D-792.
Crystallinity at room temperature of ethylene homopolymers and ethylene alpha olefin copolymers is calculated using the following equation:

$$\text{Wt \% Cryst.} = \frac{\rho_c}{\rho}\left(\frac{\rho - \rho_a}{\rho_c - \rho_a}\right)$$

where,
$\rho$=Density of ethylenic polymer (grams/cc at 23° C.)
$\rho_a$=Density of amorphous fraction (0.855 g/cc)
$\rho_c$=Density of crystalline fraction (1.00 g/cc)
Crystallinity of any ethylenic polymer is measured as follows: Determine melting peaks and percent (%) or weight percent (wt %) crystallinity of ethylenic polymer using Differential Scanning calorimeter (DSC) instrument DSC Q1000 (TA Instruments).

(A) Baseline calibrate instrument. Use software calibration wizard. First obtain a baseline by heating a cell from −80° to 280° C. without any sample in an aluminum DSC pan. Then use sapphire standards as instructed by the calibration wizard. The analyze 1 to 2 milligrams (mg) of a fresh indium sample by heating the standards sample to 180° C., cooling to 120° C. at a cooling rate of 10° C./minute, then keeping the standards sample isothermally at 120° C. for 1 minute, followed by heating the standards sample from 120° to 180° C. at a heating rate of 10° C./minute. Determine that indium standards sample has heat of fusion=28.71±0.50 Joules per gram (J/g) and onset of melting=156.6°±0.5° C.

(B) Perform DSC measurements on test samples, using same DSC instrument. Press test sample of semi-crystalline ethylenic polymer into a thin film at a temperature of 160° C. Weigh 5 to 8 mg of test sample film in DSC pan. Crimp lid on pan to seal pan and ensure closed atmosphere. Place sealed pan in DSC, cell, equilibrate cell at 30° C., and heat at a rate of about 100° C./minute to 190° C., keep sample at 190° C. for 3 minutes, cool sample at a rate of 10° C./minute to −60° C. to obtain a cool curve heat of fusion (Hf), and keep isothermally at −60° C. for 3 minutes. Then heat sample again at a rate of 10° C./minute to 190° C. to obtain a second heating curve heat of fusion (ΔHf). Using the second heating curve, calculate the "total" heat of fusion (J/g) by integrating from −20° C. (in the case of ethylene homopolymers, copolymers of ethylene and hydrolysable silane monomers, and ethylene alpha olefin copolymers of density greater than or equal to 0.90 g/cm$^3$) or −40° C. (in the case of copolymers of ethylene and unsaturated esters, and ethylene alpha olefin copolymers of density less than 0.90 g/cm$^3$) to end of melting. Using the second heating curve, calculate the "room temperature" heat of fusion (J/g) from 23° C. (room temperature) to end of melting by dropping perpendicular at 23° C. Measure and report "total crystallinity" (computed from "total" heat of fusion) as well as "crystallinity at room temperature" (computed from "room temperature" heat of fusion). Crystallinity is measured and reported as percent (%) or weight percent (wt %) crystallinity of the polymer from the test sample's second heating curve heat of fusion (ΔHf) and its normalization to the heat of fusion of 100% crystalline polyethylene, where % crystallinity or wt % crystallinity=(ΔHf*100%)/292 J/g, wherein ΔHf is as defined above, * indicates mathematical multiplication, / indicates mathematical division, and 292 J/g is a literature value of heat of fusion (ΔHf) fora 100% crystalline polyethylene.

Melt index, or $I_2$, is measured in accordance with ASTM D1238, condition 190° C./2.16 kg, and is reported in grams eluted per 10 minutes.

ACBD After Glancing Impact Test Protocol

The glancing impact test requirements for XHHW cable applications are defined by Underwriters Laboratories Inc (UL) (UL 2556 Section 7.14, Edition Number: 4, Edition Date: Dec. 15, 2015). The glancing impact test requirements for XHHW cable applications are also defined by any of Editions 1 to 4 of the UL 2556 standard.

Both ends of each of six 380-millimeter (mm) specimens of finished solid No. 14 AWG Type XHHW wire are secured to one of the broad face of a hard oak board measuring approximately 50 mm by 100 mm in cross section without damage to the insulation and in a manner that results in the wires being straight and parallel to the longitudinal axis of the board. The board is rigidly supported with the plane formed by the wires inclined 45° from the horizontal and each wire in a vertical plane. A weight of 0.454 kilogram (kg) consisting of a solid right-circular steel cylinder that is 20 mm in diameter, has all surfaces smooth, and has one end rounded to a hemisphere is supported with its longitudinal axis vertical and in a vertical plane containing one of the wires. The hemispherical end is to be down and centered 460 mm above the midpoint of the length of the wire. A straight vertical tube having a 22-mm inside diameter is to surround the cylinder and serve as a guide to keep the cylinder vertical while the cylinder is falling and after it has hit the wire. The inside surface of the guide tube is to be smooth and the tube is of a length that keeps the cylinder from coming out of the guide, tube.

While the specimen of wire, the apparatus, and the surrounding air are in thermal equilibrium with one another at a temperature of 24.0±8.0° C., the cylinder is released, fall freely in the guide tube, and strike the wire once, and is then immediately to be raised back up to and secured at the 460-mm height. This process is repeated for each of the five remaining specimens of wire. Each of the impacted specimen has its impacted area immersed in tap water that is at a temperature of 24.0±8.0° C. The water is in a plastic container and is grounded via a suspended metal rod (or in an earth-grounded metal container whose inside metal surface is directly and entirely in contact with the water, but not painted, enameled, or otherwise insulated). The insulation in the impacted area of each specimenis stressed electrically to breakdown by means of a 48-62 Hertz (Hz) potential applied between the conductor in the specimen and the earth-grounded water container. The test potential is supplied by a transformer complying with UL 1581 paragraph 820.1.

The applied potential is increased from near zero to an essentially uniform rate that (i) is not less than 100 percent of the voltage rating for the product in 60 seconds (s) and (ii) is not more than 100 percent in 10 s. The rate of increase is not to exceed 500 volts per second (V/s) in any case. The increase continues in this manner until breakdown occurs. The breakdown potential for each of the six impacted specimens is recorded. Each of six 380-mm or longer wire specimens not subjected to the impact is subjected to the dielectric-breakdown procedure with the center portion of its length immersed in water as described above. The breakdown potential is to be recorded for each of these specimens and the average of these potentials is calculated and recorded (excluding the highest and lowest values measured after glancing impact).

The average breakdown potential specimens of finished solid. No. 14 AWG Type XHHW wire that have separately been subjected to a glancing impact of 2 Joules (J) or 0.207 meters per kilogram/force (m-kgf) shall not be less than 20 percent of the average breakdown potential of six adjacent specimens of the same wire not subjected to the impact.

Hot Creep

Hot creep elongation is done according to UL 2556 Section 7.9 for conductor sizes of 8 AWG or smaller. Three samples are prepared from the finished wire by removing the insulation from the conductor without damaging the polymer sheath. The total weight to be used in the test will be determined using the following equation:

$$Wt = CA \times 29.0 \text{ lb}_f/\text{in}^2$$

where CA=the cross sectional area of the specimen.

Two marks, 25±2.5 mm apart will be placed on a specimen not under tension. The marks will be at right angles to the direction of pull during testing. One end of the specimen shall be attached to upper grip of the test assembly while the calculated weight will be attached to the other end and the distance between the marks shall be recorded. The entire assembly will be placed in a circulating-air oven preheated, to 150±2° C. for 15 min. After the 15 min, and with the weight still attached, the distance between the marks shall be measure with a scale to the nearest 1 mm. The hot creep elongation shall be calculated using the following equation:

$$C = \frac{100 \times (D_e - G)}{G}$$

where
C=hot creep elongation, %
$D_e$=distance between the benchmarks obtained
G=original distance between the benchmarks VW-1 Burns 3 or 5 cured samples for a specific formulation were subjected to VW-1 burns according to UL 2556 Section 9.4. This involved 5, 15 second applications of a 125 mm flame impinging on at an angle 20° on a vertically oriented specimen 610 mm (24 in) in length. A strip of kraft paper 12.5±1 mm (0.5±0.1 in) is affixed to the specimen 254±2 mm (10±0.1 in) above the impingement point of the flame. A continuous horizontal layer of cotton is placed on the floor of the test chamber, centered on the vertical axis of the test specimen, with the upper surface of the cotton being 235±6 mm (9.25±0.25 in) below the point at which the tip of the blue inner cone of the flame impinges on the specimen. Test failure is based upon the criteria of either burning the 25% of the kraft paper tape flag, ignition of the cotton batting or if the specimen burns longer than 60 seconds on any of the 5 flame applications. As an additional measure of burn performance, the length of uncharred insulation was measured at the completion of the test.

Tensile Strength & Elongation at Break

Tensile strength and elongation at break are done according to UL 2556 Section 3.5 using a device that indicates the actual maximum load at which the specimen breaks. The device shall operate a power-actuated jaw at speeds of 12 to 305 mm/min and a precision of 20% of the set speed. Three samples are prepared from the finished wire by removing the insulation from the conductor without damaging the polymer sheath. The specimens are straightened and cut to a length sufficient to allow a space of 0.3 in between the jaws of the testing machine when the specimen is in the initial test position. The straight specimen shall be gauge marked at two points 250±2 mm (10±0.08 in) apart. The specimen shall be gripped in the jaws of the machine with the gauge marks between the jaws, and the jaws shall be caused to separate at the rate indicated in Table 2 until the specimen breaks. In order to be accepted as valid, the break shall take place between the gauge marks and shall be no closer than 25 mm (1 in) to either gauge mark. The maximum load before break shall be recorded. The distance between the gauge marks at the time of break shall be recorded to the nearest 2 mm (0.08 in).

Hot Deformation

Hot deformation is, used for determining the resistance to deformation of the wire insulation at elevated temperatures and are done according to UL 2556 Section 7.8. A forced-circulation air oven with an accuracy of ±1° C. is set to 131° C. The wire specimens are nominal 25 mm (1 in) in length and, the diameter of the bare conductor is measured using a dial micrometer in accordance with Clause 3.1, on an adjacent section of the conductor, taken at not more than 150 mm (6 in) from the end of the specimen. The test specimen is marked at the position where the foot of the 500 g weight is to bear on the specimen. The initial thickness of the smoothed specimen is measured using a dial micrometer to an accuracy of 0.001 mm (0.0001 in). The test apparatus and the specimen are conditioned in the air oven at the 131° C. for 1 hour. At the end of this time, while still in the oven, the specimen is placed under the foot of the weight at the marked position. The specimen remains under test under these conditions for 0.5 hours.

At the end of this time, the specimen is carefully removed from under the foot of the weight. Within 15 seconds (s) of removal, the thickness at the marked position is measured. Evidence of splitting, cracking through, and exposed conductor are noted.

The percent of deformation shall be calculated using the following formula:

$$\frac{(T_1 - T_2)}{T_1} \times 100$$

where
$T_1$=thickness before test, mm (in)
$T_2$=thickness after test, mm (in)

Crush Resistance

Crush resistance is measured according to UL 2556 Section 7.11 using a power driven compression machine capable of measuring the compression force at rupture to an accuracy of 2%. The device shall operate at a power-actuated jaw speed of 10±1 mm/min (0.5±0.05 in/min), employing two flat steel plates 50 mm (2 in.) wide and a 30 Volts DC power with a means of indicating contact between the wire conductor and the steel plate. A 2500 mm (100 in) sample, with one end of the conductor made bare and connected to one side of the power plate, is placed between the horizontally mounted steel plates in the compression machine. The first test point on the specimen is centered on the lower plate and parallel to the 50 mm (2 in) dimension. The upper steel plate is lowered until contact is made with the surface of the specimen. The downward motion of the plate is continued at the specified rate until the indicator signals, contact The force indicated by the compression machine at the moment of contact is then recorded. The procedure is repeated at nine additional test points at least 250 mm (10 in) apart and at least 125 mm (5' in) from either end of the specimen. The average of the ten measurements is reported and must equal or exceed 1200 psi to be considered a passing result. The crush resistance values reported are the ultimate values, not those from an initial, peak (if any exists).

Wet Insulation Resistance

Wet insulation resistance (IR) is measured in accordance with UL-44. The wet IR test is typically conducted on a coiled moisture cured coated conductor (14 AWG copper wire with 30 mil thick insulation layer) of which 10 ft (3.048 meter) length of wire is immersed in an electrical water bath at 75° C. or 90° C. The wires are connected to a megohmmeter in a manner such that the water is one electrode and the wire conductor is the other one. In that manner, the direct current (DC) electrical resistance of the insulation layer is measured with 500 V applied. The initial measurement is taken after 6-24 hr of submersion, and all subsequent measurements are taken on a 7-day frequency for a period of up to 36 weeks, while the sample is aged under 600 V alternating current (AC).

TABLE 1

Ethylenic Polymers Employed and Their Properties

| NAME | TYPICAL FUNCTION | MELT INDEX, $I_2$ (dg/min) | DENSITY (g/cm$^2$) | CRYSTALLINITY AT ROOM TEMPERATURE CALCULATED (wt %) | CRYSTALLINITY AT ROOM TEMPERATURE MEASURED (wt %) | TOTAL CRYSTALLINITY MEASURED (wt %) |
|---|---|---|---|---|---|---|
| SI-LINK ™ AC DFDB-5451 NT (Ethylene-Silane Copolymer) | ETHYLENIC POLYMER, HAVING HYDROLYZABLE SILANE GROUPS (MOISTURE CURABLE COMPONENT) | 1.5 | 0.922 | Not Determined | 46.24 | 48.26 |
| DOW ™ DNDA-8320 NT 7 Linear Low Density Polyethylene Resin | CARRIER RESIN IN BLACK COLOR MB | 20.0 | 0.924 | 52 | 50.52 | 52.20 |

TABLE 1-continued

Ethylenic Polymers Employed and Their Properties

| NAME | TYPICAL FUNCTION | MELT INDEX, $I_2$ (dg/min) | DENSITY (g/cm$^2$) | CRYSTALLINITY AT ROOM TEMPERATURE CALCULATED (wt %) | CRYSTALLINITY AT ROOM TEMPERATURE MEASURED (wt %) | TOTAL CRYSTALLINITY MEASURED (wt %) |
|---|---|---|---|---|---|---|
| AMPLIFY ™ EA 100 Functional Polymer (Ethylene-Ethyl Acrylate Copolymer, 15 Wt % Ethyl Acrylate) | CARRIER RESIN IN FR MB | 1.3 | 0.930 | Not Determined | 32.76 | 38.74 |
| DOW ™ Electrical & Telecommunications DFDA-7530 NT | CARRIER RESIN IN FR MB | 0.7 | 0.921 | 49 | 47.58 | 49.43 |
| ENGAGE ™ 8180 Polyolefin Elastomer (Ethylene-Oetene Copolymer) | CARRIER RESIN IN FR MB | 0.5 | 0.865 | 8 | 8.52 | 15.02 |
| Experimental Ethylene/1-Octene Polyolefin Elastomer | CARRIER RESIN IN FR MB | 3.0 | 0.875 | 16 | 17.45 | 23.80 |
| DOW ™ LLDPE 1648 Linear Low Density Polyethylene Resin (Ethylene-Hexene Copolymer) | CARRIER RESIN IN FR MB | 3.5 | 0.920 | 49 | 48.39 | 50.07 |
| DOWLEX ™ 2606G Linear Low Density Polyethylene Resin | CARRIER RESIN IN FR MB | 4.0 | 0.920 | 49 | 50.31 | 52.02 |
| DOWLEX ™ 2035G Linear Low Density Polyethylene Resin | CARRIER RESIN IN FR MB | 6.0 | 0.919 | 48 | 46.9 | 48.56 |
| DOWLEX ™ 2036G Linear Low Density Polyethylene Resin | CARRIER RESIN IN FR MB | 2.5 | 0.935 | 59 | 57.28 | 57.98 |
| ELITE ™ 5940G Enhanced Polyethylene Resin | CARRIER RESIN IN FR MB | 0.85 | 0.946 | 62 | 64.86 | 65.48 |
| DOW ™ Electrical & Telecommunications DGDA-1310 NT | CARRIER RESIN, IN FR MB | 0.3 | 0.954 | 72 | 73.59 | 73.84 |
| ELITE ™ 5960G Enhanced Polyethylene Resin | CARRIER RESIN IN FR MB | 0.85 | 0.962 | 77 | Not Measured | Not Measured |
| AXELERON ™ CX 6944 NT CPD High Density Polyethylene Insulation Compound | CARRIER RESIN IN FR MB | 8.0 | 0.965 | 79 | 80.17 | 80.17 |

MB: MASTERBATCH

FR: FLAME-RETARDANT

TABLE 2

Thermoplastic Compositions Used as Flame-Retardant Masterbatches (CE1 to CE3 and IE1 to IE6)

| COMPONENT | MELT INDEX | DEN. | CE1 LOADING (Wt %) | CE2 LOADING (Wt %) | CE3 LOADING (Wt %) | IE1 LOADING (Wt %) | IE2 LOADING (Wt %) | IE3 LOADING (Wt %) | IE4 LOADING, (Wt %) | IE5 LOADING, (Wt %) | IE6 LOADING (Wt %) |
|---|---|---|---|---|---|---|---|---|---|---|---|
| AMPLIFY ™ EA 100 | 1.3 | 0.930 | 19.55 | — | — | — | — | — | — | — | — |
| ENGAGE ™ 8180 | 0.5 | 0.865 | — | 19.55 | — | — | — | — | — | — | — |
| Experimental Ethylene/1-Octene Polyolefin Elastomer | 3.0 | 0.875 | — | — | 19.55 | — | — | — | — | — | — |
| LLDPE 1648 | 3.5 | 0.920 | — | — | — | — | 18.75 | — | — | — | — |
| DOWLEX ™ 2606G | 4.0 | 0.920 | — | — | — | — | — | 19.55 | — | — | — |
| DOWLEX ™ 2035G | 6.0 | 0.919 | — | — | — | — | — | — | 18.75 | — | — |
| DGDA-1310 NT | 0.3 | 0.954 | — | — | — | 19.55 | — | — | — | — | — |
| ELITE ™ 5960G | 0.85 | 0.962 | — | — | — | — | — | — | — | 19.55 | — |
| AXELERON ™ CX 6944 | 8.0 | 0.965 | — | — | — | — | — | — | — | — | 19.55 |
| SAYTEX ™ 8010 Halogenated Flame Retardant | — | 3.250 | 45.00 | 45.00 | 45.00 | 45.00 | 40.40 | 45.00 | 40.40 | 45.00 | 45.00 |
| BRIGHTSUN HB Antimony Trioxide | — | 5.400 | 35.00 | 35.00 | 35.00 | 35.00 | 30.30 | 35.00 | 30.30 | 35.00 | 35.00 |
| ZOCO 104 Zinc Oxide | — | 5.600 | — | — | — | — | 10.10 | — | 10.10- | — | — |

TABLE 2-continued

Thermoplastic Compositions Used as Flame-Retardant Masterbatches (CE1 to CE3 and IE1 to IE6)

| COMPONENT | MELT INDEX | DEN. | CE1 LOADING (Wt %) | CE2 LOADING (Wt %) | CE3 LOADING (Wt %) | IE1 LOADING (Wt %) | IE2 LOADING (Wt %) | IE3 LOADING (Wt %) | IE4 LOADING, (Wt %) | IE5 LOADING, (Wt %) | IE6 LOADING (Wt %) |
|---|---|---|---|---|---|---|---|---|---|---|---|
| Masterbatch of Chimasorb 119 Hindered Amine Light Stabilizer in AMPLIFY ™ EA 100 (3 wt % Chimassorb 119 concentration) | — | 1.000 | 0.40 | 0.40 | 0.40 | 0.40 | 0.40 | 0.40 | 0.40 | 0.40 | 0.40 |
| IRGANOX ™ 1010 | — | 1.000 | 0.05 | 0.05 | 0.05 | 0.05 | 0.05 | 0.05 | 0.05 | 0.05 | 0.05 |
| Total | | | 100.00 | 100.00 | 100.00 | 100.00 | 100.00 | 10.0.00 | 100.00 | 100.00 | 100.00 |

SAYTEX ™ 8010 by Albernarle is ethylene-1,2-bis(pentabromophenyl).

IRGANOX ™ 1010 by BASF is pentaerythritol tetrakis(3-(3,5-di-tert-butyl-1-hydroxyphenyl)propionate).

TABLE 3

Crosslinked Wire Insulation Compositions Made with Flame-Retardant Masterbatches of Table 2
(CE4 to CE6 and IE7 to IE12)

| COMPONENTS | CE4 LOADING (Wt %) | CE5 LOADING (Wt %) | CE6 LOADING (Wt %) | IE7 LOADING (Wt %) | IE8 LOADING (Wt %) | IE9 LOADING (Wt %) | IE10 LOADING (Wt %) | IE11 .LOADING (Wt %) | IE12 LOADING (Wt %) |
|---|---|---|---|---|---|---|---|---|---|
| SI-LINK ™ AC DFDB-5451 NT | 45.00 | 45.00 | 45.00 | 36.10 | 45.50 | 45.00 | 45.50 | 42.00 | 45.00 |
| SI-LINK ™ DFDA-5481 Natural (Catalyst Masterbatch) | 5.00 | 5.00 | 5.00 | 5.00 | 5.00 | 5.00 | 5.00 | 5.00 | 5.00 |
| Components Introduced Through Flame-Retardant Masterbatches of Table 2 | | | | | | | | | |
| AMPLIFY ™ EA 100 | 9.96 | 0.194 | 0.194 | 0.194 | 0.194 | 0.194 | 0.194 | 0.204 | 0.194 |
| ENGAGE ™ 8180 | — | 9.78 | — | — | — | — | — | — | — |
| Experimental Ethtylene/1-Octene Polyolefin Elastomer | — | — | 9.78 | — | — | — | — | — | — |
| LLDPE 1648 | — | — | — | — | 9.28 | — | — | — | — |
| DOWLEX ™ 2606G | — | — | — | — | — | 9.78 | — | — | — |
| DOWLEX ™ 2035G | — | — | — | — | — | — | 9.28 | — | — |
| DGDA-1310 NT | — | — | — | 11.51 | — | — | — | — | — |
| ELITE ™ 5960G | — | — | — | — | — | — | — | 10.36 | — |
| AXELERON ™ CX 6944 | — | — | — | — | — | — | — | — | 9.78 |
| SAYTEX 8010 Halogenated Flame Retardant | 22.50 | 22.50 | 22.50 | 26.51 | 20.00 | 22.50 | 20.00 | 23.85 | 22.50 |
| BRIGHTSUN HB Antimony Trioxide | 17.50 | 17.50 | 17.50 | 20.62 | 15.00 | 17.50 | 15.00 | 18.55 | 17.50 |
| ZOCO 104 Zinc Oxide | — | — | — | — | 5.00 | — | 5.00 | — | — |
| Chimassorb 119 Hindered Amine Light Stabilizer) | 0.006 | 0.006 | 0.006 | 0.006 | 0.006 | 0.006 | 0.006 | 0.006 | 0.006 |
| Irganox 1010 | 0.03 | 0.03 | 0.03 | 0.03 | 0.02 | 0.03 | 0.02 | 0.03 | 0.03 |
| Total | 100.00 | 100.00 | 100.00 | 100.00 | 100.00 | 100.00 | 100.00 | 100.00 | 100.00 |
| Hot Creep (150° C.) | 28.6% | Not Tested | Not Tested | 31.1% | Not Tested | Not Tested | Not Tested | 21.8% | 18.6% |
| Hot Deformation (%) | Not Tested | Not Tested | Not Tested | 8.4% | Not Tested | Not Tested | Not Tested | 6.0% | 9.3% |
| Tensile Strength (psi) | 1.775 | 1.639 | 1.516 | 2.158 | Not Tested | Not Tested | Not Tested | 2.282 | 2.292 |
| Tensile Elongation (%) | 169% | 113% | 102% | 5% | Not Tested | Not Tested | Not Tested | 193% | 194% |
| Retained ACBD after Glancing Impact (%) | 12% | 11% | 8% | 68% | 69% | 50% | 37% | 96% | 82% |
| Crush Resisthnce (psi) | 1505 | 1481 | 1511 | 1495 | 1190 | 1545 | 1269 | >1600 | 1524 |
| VW-1: Pass/Tested (Number of Specimens) | 3/3 | Not Tested | Not Tested | Not Tested | 5/5 | Not Tested | 5/5 | Not Tested | 3/3 |

TABLE 3-continued

Crosslinked Wire Insulation Compositions Made with Flame-Retardant Masterbatches of Table 2
(CE4 to CE6 and IE7 to IE12)

| COMPONENTS | CE4 LOADING (Wt %) | CE5 LOADING (Wt %) | CE6 LOADING (Wt %) | IE7 LOADING (Wt %) | IE8 LOADING (Wt %) | IE9 LOADING (Wt %) | IE10 LOADING (Wt %) | IE11 LOADING (Wt %) | IE12 LOADING (Wt %) |
|---|---|---|---|---|---|---|---|---|---|
| VW-1: Max Burn Duration (s) | 3 sec. | Not Tested | Not Tested | Not Tested | 19 sec. | Not Tested | 40 sec. | Not Tested | 38 sec. |
| VW-1: UnCharred Length (min) | 166 mm | Not Tested | Not Tested | Not Tested | 138 mm | Not Tested | 125 mm | Not Tested | 87 mm |

TABLE 4

Crosslinked Wire Insulation Compositions Made with Pre-Mixed Compositions
(CE7 to CE8 and IE13 to IE17)

| COMPONENTS | CE7 LOADING (%) | CE8 LOADING (%) | IE13 LOADING (%) | IE14 LOADING (%) | IE15 LOADING (%) | IE16 LOADING (%) | IE7 LOADING (%) |
|---|---|---|---|---|---|---|---|
| SI-LINK™ DFDA-5481 Natural (Catalyst Masterbatch) | 5 | 5 | 5 | 5 | 5 | 5 | 5 |
| Components (Pre-Mixed before Wire Extrusion) | | | | | | | |
| DFDB-5451 | 45.03 | 40.28 | 35.53 | 50.07 | 50.07 | 50.07 | 50.07 |
| DFDA-7530 NT | | | 14.25 | | | | |
| ENGAGE™ 8180 | 4.75 | 9.50 | | | | | |
| LLDPE 1648 | | | | 2.85 | 4.75 | | |
| DOWLEX™ 2036G | | | | | | 4.75 | |
| ELITE™ 5940G | | | | | | | 4.75 |
| AXELERON™ CX 6944 | 9.79 | 9.79 | 9.79 | 6.65 | 4.75 | 4.75 | 4.75 |
| SAYTEX 8010 Halogenated Flame Retardant | 17.01 | 17.01 | 17.01 | 17.01 | 17.01 | 17.01 | 17.01 |
| BRIGHTSUN HB Antimony Trioxide | 13.21 | 13.21 | 13.21 | 13.21 | 13.21 | 13.21 | 13.21 |
| Kadox 920 Zinc Oxide | 4.75 | 4.75 | 4.75 | 4.75 | 4.75 | 4.75 | 4.75 |
| Masterbatch of Chimasorb 119 Hindered Amine Light Stabilizer in AMPLIFY™ EA 100 (3 wt % Chimassorb 119 concentration) | 0.19 | 0.19 | 0.19 | 0.19 | 0.19 | 0.19 | 0.19 |
| Irganox 1010 | 0.29 | 0.29 | 0.29 | 0.29 | 0.29 | 0.29 | 0.29 |
| Total | 100.00 | 100.00 | 100.00 | 100.00 | 100.00 | 100.00 | 100.00 |
| Retained ACBD after Glancing Impact (%) | <15 | <15 | >40 | 72 | 67 | 64 | 85 |
| Crush Resistance (psi) | 1166 | 1274 | 1380 | 1200 | 1285 | 1200 | 1220 |
| VW-1: Pass/Tested (Number of Specimens) | 0/3 | 0/3 | 0/3 | 3/3 | 3/3 | 3/3 | 3/3 |
| VW-1: Max Burn Duration (s) | Failed | Failed | Failed | 49 sec. | 46 sec. | 60 sec. | 62 sec. |
| VW-1: UnCharred Length (mm) | Failed | Failed | Failed | 207 mm | 214 mm | 231 mm | 236 mm |

TABLE 5

Crosslinked Wire Insulation Compositions Made with VTMS Soaked into Polyethylene and Grafting Achieved During Wire Extrusion (CE9 and IE18)

| COMPONENTS | CE9 LOADING (%) | IE18 LOADING (%) |
|---|---|---|
| SI_LINK™ DFDA-5481 Natural (Catalyst Masterbatch) | 4 | 4 |
| DFDA-7530 NT | 44.4 | 44.4 |
| VTMS (Soaked into Physical Blend of FR Masterbatch and DFDA-7530 NT and Grafted During Wire Extrusion) | 1.5 | 1.5 |
| Luperox 101 peroxide (Soaked into Physical Blend of FR Masterbatch and DFDA-7530 NT) | 0.1 | 0.1 |
| Components Introduced Through Flame-Retardant Masterbatches of Table 2 | | |
| AMPLIFY™ EA 100 | 9.78 | |
| AXELERON™ CX 6944 | | 9.78 |
| SAYTEX 8010 Halogenated Flame Retardant | 22.5 | 22.5 |

TABLE 5-continued

Crosslinked Wire Insulation Compositions Made with VTMS Soaked into Polyethylene and Grafting Achieved During Wire Extrusion (CE9 and IE18)

| COMPONENTS | CE9 LOADING (%) | IE18 LOADING (%) |
|---|---|---|
| BRIGHTSUN HB Antimony Trioxide | 17.5 | 17.5 |
| Masterbatch of Chimassorb 119 Hindered Amine Light Stabilizer in AMPLIFY ™ EA 100(3 wt % Chimasorb 119 concentration) | 0.2 | 0.2 |
| Irganox 1010 | 0.03 | 0.03 |
| Total | 100.00 | 100.00 |
| Retained ACBD after Glancing Impact (%) | 25 | 38 |
| Crush Resistance (psi) | 1396 | 1277 |

What is claimed is:

1. A masterbatch composition comprising in weight percent based on the weight of the composition:
   (A) 10 to 50 weight percent (wt %) of an ethylenic polymer with (1) a crystallinity at room temperature of 34% to 55%, or 65% to 80%, and (2) a melt index ($I_2$) of 0.1 to 50 decigrams per minute (dg/min), wherein the ethylenic polymer is linear or substantially linear and is an ethylene homopolymer or ethylene-α-olefin copolymer;
   (B) 15 to 60 wt % of a halogenated flame retardant;
   (C) 15 to 60 wt % an inorganic antimony flame retardant; and
   (D) 0 to 20 wt % of at least one of an inorganic flame retardant other than the inorganic antimony flame retardant.

2. The composition of claim 1 in which the halogenated flame retardant is at least one of perchloropentacyclodecane; a Diels-Alder adduct of hexachlorocyclopentadiene with maleic anhydride; hexabromobenzene; pentabromoethylbenzene 2,4,6-tribromophenol; tribromophenyl allyl ether; ethylene-1,2-bis(pentabromophenyl); octaobromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylene-bis (tetrabromophthatmide); and hexabromocyclododecane.

3. The composition of claim 1 in which the inorganic antimony flame retardant is at least one of antimony trioxide, antimony pentoxide, or an antimony silicate.

4. The composition of claim 1 in which the at least one inorganic flame retardant other than the antimony flame retardant is a zinc compound.

5. The composition of claim 4 in which the zinc compound is at least one of zinc oxide, zinc borate, zinc molybdate and zinc sulfide.

6. The masterbatch composition of claim 1 in which the composition is thermoplastic.

7. The masterbatch composition of claim 1, wherein the ethylenic polymer has a crystallinity at room temperature of 34% to 49%.

8. The masterbatch composition of claim 1, wherein the ethylenic polymer has a density of 0.919 g/cc to 0.920 g/cc as measured according to ASTM D-792.

9. The masterbatch composition of claim 1, wherein the masterbatch composition comprises in weight percent based on the weight of the composition:
   (A) 10 to 25 wt % of the ethylenic polymer;
   (B) 40.40 to 45 wt % of the halogenated flame retardant; and
   (C) 30.30 to 35 wt % of the inorganic antimony flame retardant.

* * * * *